Feb. 7, 1933.  A. H. GFRORER  1,896,543
INDUSTRIAL TRUCK
Filed Feb. 18, 1929    2 Sheets-Sheet 1
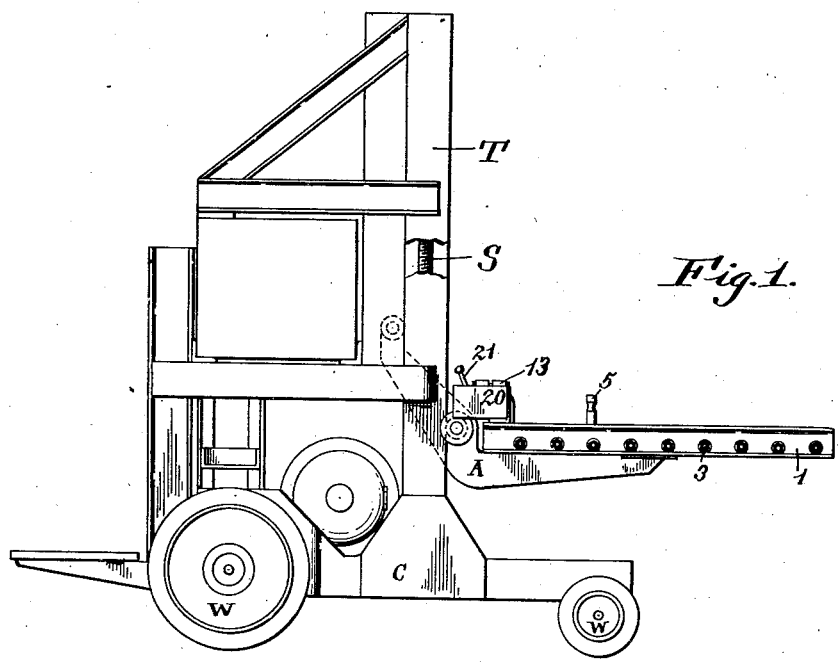
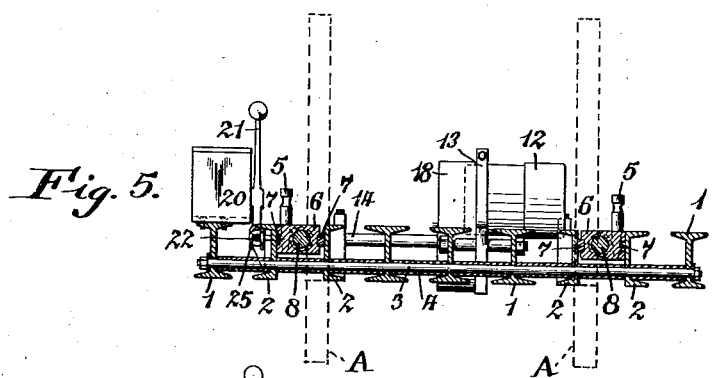
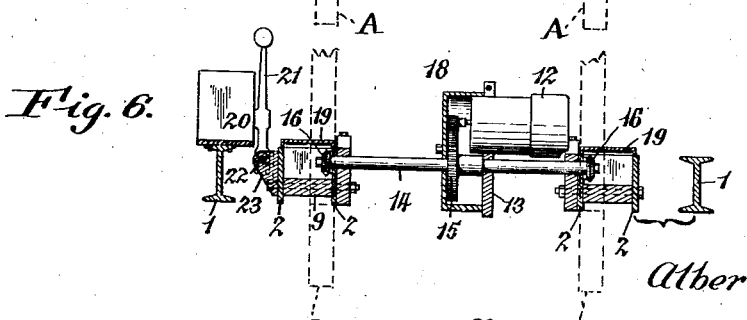
Inventor
Albert H. Gfrorer
By Popp and Powers
Attorney Feb. 7, 1933.   A. H. GFRORER   1,896,543
INDUSTRIAL TRUCK
Filed Feb. 18, 1929   2 Sheets-Sheet 2
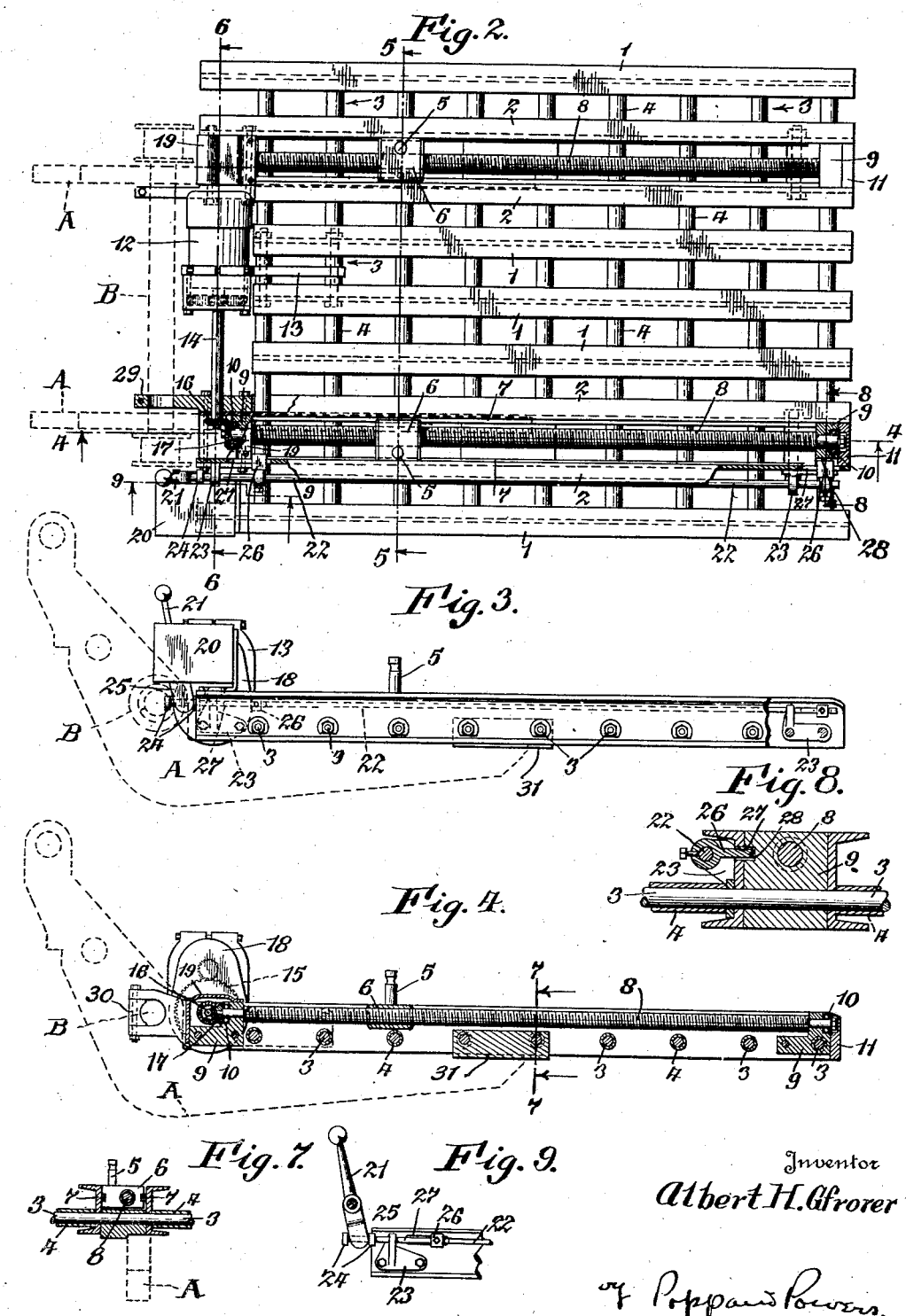
Inventor
Albert H. Gfrorer
by Popp and Powers
Attorney Patented Feb. 7, 1933

1,896,543

UNITED STATES PATENT OFFICE

ALBERT H. GFRORER, OF BUFFALO, NEW YORK, ASSIGNOR TO THE AUTOMATIC TRANSPORTATION COMPANY, INC., OF BUFFALO, NEW YORK, A CORPORATION OF NEW YORK

INDUSTRIAL TRUCK

Application filed February 18, 1929. Serial No. 340,732.

This invention relates to improvements in industrial trucks and to load handling platform features thereof, proposing a construction which is particularly intended for, although not necessarily limited to, a truck of the tiering lifting type, that is to say a truck having a load handling platform which is movable by power mechanism to any desired elevation at which the load is to be taken on or discharged.

The principal object of the invention is to provide greater facility in placing heavy loads upon the platform and in discharging such loads, thereby to save manual labor, reduce load handling hazards, and save time in the operation of the truck.

With this object in view the invention contemplates a load carrying platform equipped with load moving elements which may be operated by power and as so operated are automatically stopped at the end of their travel in either direction.

A further object is to provide a load handling platform having the characteristics mentioned which is of self-contained construction and is therefore applicable as a unit to industrial trucks already in use.

An embodiment of the invention is illustrated in the accompanying drawings wherein:

Figure 1 is a side elevation of an industrial truck having a load platform which is constructed in accordance with the invention.

Figure 2 is a top plan view partly in section of the load platform.

Figure 3 is a side elevation of the load platform.

Figure 4 is a section along line 4—4 of Fig. 2.

Figure 5 is a section along line 5—5 of Fig. 2.

Figure 6 is a section along line 6—6 of Fig. 2.

Figure 7 is a detail cross section on the line 7—7 of Figure 4.

Figure 8 is a detail section on the line 8—8 of Figure 2.

Figure 9 is an enlarged fragmentary view of the switch operating lever and co-operating elements.

A load-carrying platform constructed in accordance with the invention may be applied to any suitable type of truck but has particular utility in connection with industrial trucks which are equipped with vertically movable load platforms to enable the load to be taken on or discharged at any desired elevation. A truck of this type is, therefore, illustrated in Figure 1 as indicated at T. The truck T includes a chassis C which is supported on wheels W and an elevating screw S which forms a prime element of mechanism (not otherwise shown) for raising or lowering a pair of spaced armlike members A upon which the load platform and associated parts are supported.

The platform structure includes a plurality of load supporting members which may be of any suitable form but which are herein shown as consisting of structural I beam and channel sections 1 and 2 respectively. These members are held in spaced parallel longitudinal arrangement by a series of cross-rods 3 extending transversely through their web portions, the spacing being maintained by spacers 4 fitted over said cross-rods between adjacent members. In the embodiment herein illustrated, the channel members 2 are arranged in pairs adjacent opposite sides of the platform, the channels of each pair being placed in back to back relation and spaced, of course, by the spacers 4. These channels provide passageways for the movement of upright elements 5 which form a part of the load handling mechanism and by which the load is pulled on or pushed from the platform. The elements 5 are in the form of relatively short posts which project to a suitable extent from the upper face of the platform and are carried by and removably fitted in blocks 6 located in the channel passageways. The sides of the blocks 6 are grooved to receive guide strips 7 which are riveted or otherwise secured to the channel members 2. The movement of the elements 5 is effected through threaded bars 8 which extend through the passageways in threaded engagement with the blocks 6. The bars 8 are journaled at their ends in bearing standards 9 and are provided with thrust bearings 10 located in suitable recesses in the standards 9. The standards located at the free end of the platform, that is to say the end remote from the truck proper, are provided with face plates 11 to cover the thrust bearings 10 and, as shown, are supported by one of the cross rods 3 and a bolt extending through both the standards and the adjacent channel members. The standards at the opposite end of the platform are supported in any suitable manner as by the bolts shown.

The movement of the threaded bars 8 may be effected by any suitable means but preferably is effected by a reversible electric motor 12. The motor 12 is carried by a bracket 13 which, as shown, is supported by a pair of cross rods 3 and a pair of bolts extending through adjacent I beam sections 1. The motor is operatively connected to the threaded bars 8 by a transverse shaft 14, the pinion of the motor meshing with a gear 15 fixed to the shaft 14 intermediate its ends. The ends of the shaft 14 are provided with beveled gears 16 for driving engagement with beveled gears 17 on the threaded bars 8. The pinion of the motor and gear 15 preferably are enclosed by a cover 18 which is secured to the bracket 13 while the gears 16 and 17, together with the thrust bearings 10 are enclosed by covers 19 secured to the bearing standards. Obviously the rotation of the motor 12 in one direction or the other will cause the blocks 6, and hence the load moving elements 5, to travel along the channel passageways either toward or away from the free end of the platform. In order to control the movement of the elements 5, means is provided for controlling the motor. This means includes a switch box 20 secured to the platform and containing a reversing switch through which the motor circuit is controlled. The operation of the switch is effected through a lever 21 which is pivotally mounted on the switch box. The arrangement of the switch is such as to stop the motor when the lever 21 is moved to an upright position and to start the motor in one direction or the other when the lever is moved to one side or the other of the upright position. The starting of the motor is, of course, effected by a manual operation of the lever but the stopping of the motor may be effected either by a manual or automatic operation of the lever.

The automatic operation of the lever is effected at the end of the travel of the elements 5 to prevent the stalling of the motor or breakage of associated parts. For this purpose a shiftable rod 22 is utilized, this rod being supported longitudinally within the channel of one of the channel members 2 by spaced bearing standards 23. The standards 23 are bolted or otherwise secured to the adjacent channel member and are arranged to permit longitudinal movement of the rod 22. That end of the rod 22 which extends adjacent the switch box 20, is provided with spaced annular flanges 24 between which the forked end 25 of the lever 21 extends whereby a longitudinal movement of the rod effects a pivotal movement of the lever so as to operate the switch.

The rod 22 is provided, at points adjacent the bearing standards 9, with transversely extending members 26. These members project through slots 27 formed in the adjacent channel member 2 and are so positioned that one member projects into the channel passageway when the other member projects into a groove 28 formed in the adjacent bearing standard 9. It will, of course, be understood that the arrangement of the switch is such as to cause the elements 5 to travel toward that one of the members 26 which projects into the channel passageway whereby as the elements approach the end of their travel, one of the blocks 6 will engage such member 26 and move it partly into the groove 28 so as to operate the lever 21 and stop the motor.

The platform is constructed as a unit and preferably is pivotally mounted upon the arms A of the truck by means of spaced brackets 29 suitably secured to channel members 2, it being noted that these brackets also serve to support the drive shaft 14. The free ends of the brackets are forked to fit over a bar B carried by the arms A, the securement of the brackets to the bar B being effected by insertible elements 30 which are bolted across the forked ends and formed to fit the bar B. The platform rests upon the arms A and is provided with blocks 31 suitably located in the channel passageways. Each block 31 is carried by a pair of cross rods 3 and extends slightly below the lower marginal edge of the adjacent channel member 2. A portion of the lower surface of the blocks 31 adjacent the channel member 2, is cut away so that it is flush with the marginal edge of the member 2. The arm A fits against the flush surfaces of the member 2 and block 31 (see Figs. 4 and 7) whereby the parts of the blocks 31 which project below the channel members are effective in co-operation with the arms A to prevent side motion of the platform.

When it is desired to load the truck, the platform is moved to the desired elevation. The motor 12 is then operated to move the posts 5 to the free end of the platform whereupon the load is connected in any suitable manner to the posts. The switch lever 21 is then operated to the position shown in the drawings to reverse the motor and cause the posts to move toward the truck proper thereby to pull the load upon the platform. As the posts 5 approach the end of their travel, one of the blocks 6 engages and moves a member 22, thereby moving the lever 21, through the rod 22, to the upright position and thus stopping the motor.

When the truck is to be unloaded, the lever is manually operated from the upright position to a position opposite from that shown in the drawings. This, of course, causes the posts 5 to move toward the free end of the platform during which movement they push the load from the platform and at the end of which movement the lever 21 is again automatically moved to the upright position to stop the motor.

It will also be readily appreciated that the pivotal mounting of the platform permits it to swing upwardly when it encounters an obstruction while being lowered. Obviously this arrangement avoids the stalling of the motor of the lifting mechanism or the breakage of associated parts which otherwise would follow.

In the event the nature of the load or any local circumstances of environment or use should render the posts 5 undesirable these can be removed whereby the platform as to its external form will be of the usual character.

In other words, the blocks 6 being substantially flush with the supporting surface of the load supporting frame they will not in any way interfere with loading or unloading of the truck when this is done manually. Thus by removing the elements 5 the blocks become a part of the supporting surface regardless of their positions in the passageways.

Having fully described my invention, I claim:

1. A truck platform of the class described comprising a load supporting frame, a member mounted on said frame for movement back and forth between determined limits, said member being adapted for connection with a load to move it on or off the load supporting frame, an electric motor on the frame for moving said member and means for breaking the circuit through said motor when said member reaches the limit of its movement in either direction.

2. A truck platform of the class described comprising a load supporting frame having a passageway, a member mounted in and movable along said passageway said member being adapted for connection with a load to move it on or off the load supporting frame, an electric motor on the frame for moving said member back and forth along said passageway and means arranged along said passageway for breaking the current through said motor when said member reaches the limit of its movement in either direction, said member being arranged for movement in said passageway so as not to project above the supporting surface of the frame.

3. A truck platform of the class described comprising a load supporting frame having a passageway, a threaded bar longitudinally arranged and rotatably mounted in said passageway, a member connected to said bar and adapted for movement along the passageway in one direction or the other depending upon the direction in which said bar is rotated, said member being adapted for connection with a load to move it relatively to said supporting frame, an electric motor on the frame for rotating said bar in either direction and means for breaking the circuit through said motor after said member has traveled a predetermined distance, said member being arranged for movement in said passageway so as not to project above the supporting surface of the frame.

4. A truck platform of the class described comprising a load supporting frame having a passageway, a member mounted in said passageway, said member being adapted for connection with a load to move it on or off the load supporting frame, an electric motor on the frame for moving said member back and forth along said passageway, a switch for controlling said motor and means arranged adjacent said passageway operable by said member when it reaches the limit of its movement in either direction for operating said switch, said member being arranged for movement in said passageway so as not to project above the supporting surface of the frame.

5. A truck platform of the class described comprising a load supporting frame having a passageway, a member mounted in and movable along said passageway, said member being adapted for connection with a load to move it on or off the load supporting frame, an electric motor on the frame for moving said member back and forth along said passageway, a switch for controlling said motor and means arranged adjacent said passageway operable by said member after it has traveled a predetermined distance for operating said switch, said member being arranged for movement in said passageway so as not to project above the supporting surface of the frame.

6. A truck platform of the class described comprising a load supporting frame having a passageway, a member mounted in and movable along said passageway, said member being adapted for connection with a load to move it on or off the load supporting frame, an electric motor on the frame for moving said member back and forth along said passageway, means arranged along said passageway for breaking the current through said motor when said member reaches a limit of its movement in either direction, said member being arranged for movement in said passageway so as not to project above the supporting surface of the frame and removable means carried by said member projecting above the surface of said supporting frame and by which the said member is connected to said load.

In testimony whereof I hereby affix my signature.

ALBERT H. GFRORER.